United States Patent [19]

Scott et al.

[11] Patent Number: 4,468,204

[45] Date of Patent: Aug. 28, 1984

[54] PROCESS OF HUMAN-MACHINE INTERACTIVE EDUCATIONAL INSTRUCTION USING VOICE RESPONSE VERIFICATION

[75] Inventors: Brian L. Scott; William D. Wagers, Jr., both of Denton, Tex.

[73] Assignee: Scott Instruments Corporation, Denton, Tex.

[21] Appl. No.: 352,115

[22] Filed: Feb. 25, 1982

[51] Int. Cl.³ .............................................. G09B 7/02
[52] U.S. Cl. ...................................... 434/309; 434/314; 434/321; 434/323; 434/335
[58] Field of Search .............................. 434/319–321, 434/308–310, 323, 314–316, 350–351, 262, 335; 364/521, 410, 419; 179/1 SB, 1 SM; 381/40–43

[56] References Cited

U.S. PATENT DOCUMENTS

| | | | |
|---|---|---|---|
| 3,609,227 | 9/1971 | Kuljian | 434/319 |
| 3,673,331 | 6/1972 | Hair et al. | 179/1 SB |
| 3,996,671 | 12/1976 | Foster | 434/321 |
| 4,060,915 | 12/1977 | Conway | 434/350 |
| 4,305,131 | 12/1981 | Best | 358/342 |
| 4,333,152 | 6/1982 | Best | 273/DIG. 28 |
| 4,372,554 | 2/1983 | Orenstein | 434/308 |

Primary Examiner—Richard C. Pinkham
Assistant Examiner—Leo P. Picard
Attorney, Agent, or Firm—Harold E. Meier

[57] ABSTRACT

A method of human-machine interactive instruction with the aid of a digital computer is disclosed. The first step is providing the computer with a data base of a series of questions and answers which can be reproduced and thereafter individualized by student use by (i) providing the digital computer with a keyboarded typed question, (ii) providing the computer with a keyboarded typed answer, (iii) speaking the correct answer a plurality of times to generate relational signals for master template of the correct answer in digital form, and (iv) correlating the master template with the corresponding keyboarded typed answer. The second step is providing a human machine voice display interactive tutorial process, by for each question and answer in the data base of questions and answers, sequentially (i) displaying a typed question, (ii) displaying the corresponding correct typed answer, (iii) initiating the articulation of the correct answer by a user, (iv) processing the so-spoken answer by converting it from an audio signal into relational signals in digital form, (v) determining whether the processed spoken answer in digital form corresponds to the master template for that answer, and (vi) adjusting the master template to individualize it for the speaker if the processed spoken answer in digital form does not correspond to the master template.

14 Claims, 9 Drawing Figures

PROCESS OF HUMAN-MACHINE INTERACTIVE EDUCATIONAL INSTRUCTION USING VOICE RESPONSE VERIFICATION

TECHNICAL FIELD

This invention pertains to a process of human-machine interactive instruction involving the electronic recognition of speech and more particularly to a process for teacher-machine and student-machine sequential real time voice interaction.

BACKGROUND OF THE INVENTION

It has heretofore been realized that speech recognition circuitry coupled with a computer can be used to great advantage in a wide variety of tasks. Typically, the interface between a computer and a human operator has been a mechanical keyboard. Prior art keyboard interfaces had a number of disadvantages including slow speed, expense, the need for training for the operator and the limitations that the operator's hands were fully occupied and could not be used for other purposes. Thus, despite the apparent advantages of human-machine speech-display real time interaction, only limited success has been achieved to date. Numerous obstacles must be overcome before a successful speech recognition process can be implemented at a reasonable cost. A number of problems in designing such a system include the variability of speech from one person to another, the need to produce an accurate template representing each speech unit and the need for a high speed computer having rapidly accessible mass memory to handle the size of vocabulary needed for a useful application.

There exists a need for a human-machine interactive instructional process in which the process is essentially independent of the speaker, and in which the student is able to proceed at his or her own rate sequentially through rote learning and testing steps.

It is an object of the present invention to devise a method of human-machine voice-display interactive instruction with the aid of a digital computer which is quite flexible, and can be used as easily for first graders as for college seniors or workers. It is a further object of the present invention to devise a method which can be used for either individualized or generalized tutoring, practice and testing and which motivates students to desire to study and learn. It is a further object of the present invention to develop a method which frees instructors from the task of teaching by rote, affording the opportunity of additional time for individual instruction or lesson planning, and yet which requires no expensive computer training in order for the instructor to design computer lessons. It is a further object of the subject invention to introduce children to computers in an unobtrusive manner and to provide a process whereby students can talk to the computer in their plain language. It is a further object of the present invention to produce a method which provides positive reinforcement at each step of the lesson for the students and which monitors the student's progess, providing a report card for the instructor.

SUMMARY OF THE INVENTION

The present invention is a process of human-machine voice interactive instruction utilizing voice verification (rather than speech recognition) with the aid of a digital computer. The computer is first provided with a data base of a series of questions and answers by an instructor which can be reproduced and thereafter individualized for student use. The data base is generated by the instructor sequentially providing a digital computer with a typed question, with a typed answer, and then by speaking the correct answer a plurality of times, which voice answer is used to generate a master template of the correct answer in digital form in the digital computer. Each of the series of questions and answers (typed and spoken) is then correlated within the data base. Then, a human-machine voice interactive instruction step is conducted by, for each question and answer in a series of question and answers, first displaying a typed question and then displaying the appropriate typed answer. The student then is requested to articulate the correct answer. The spoken answer is converted into relational signals in digital form, and it is determined whether the so-converted spoken answer in digital form corresponds to the master template for that answer. The master template may be adjusted, if necessary, to individualize it for the speaker, if the processed spoken answer does not correspond to the master template. Voice verification, rather than speech recognition, is utilized herein since the subject invention only requires verification of whether or not the correct word or phrase had been articulated. The present invention comprises the further step of conducting a human-machine interactive instruction test. This involves displaying a typed question, initiating the articulation of an answer by the student and processing the spoken answer by converting it into relational signals in digital form. The data processing system then utilizes voice verification to determine whether the processed spoken answer in digital form is the correct answer by comparing it to the master template, as individualized for the student. If the processed spoken answer in digital form is the correct answer, the student is told he or she has given the correct answer, and the next question in the series is then displayed. If the processed spoken answer in digital form is not the correct answer, the student is so told, the correct answer is displayed, and the foregoing test steps are repeated a predetermined number of times. If the processed spoken answer in digital form is still not deemed a match with the master template but is within a specified predetermined tolerance, the master template is dynamically adjusted to reflect the student's pronunciation. Then the system continues on to the next question in the series of test questions and answers.

BRIEF DESCRIPTION OF DRAWINGS

For a more complete understanding of the present invention and the advantages thereof, reference is now made to the following description taken in conjunction with the accompanying Drawings in which.

DETAILED DESCRIPTION

Figure 1:
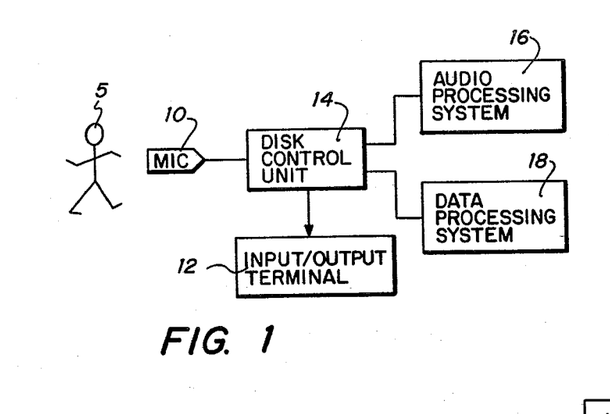
FIG. 1 is a block diagram of an overview of the system of the present invention.

The present invention comprises a process of human-machine interactive instruction utilizing a digital computer. Referring to FIG. 1 there is shown a block diagram of an overview of the subject invention. As will be more fully described hereinafter, a user 5 interacts with a data base in the digital computer by means of microphone 10 and input/output terminal 12. Access to the appropriate data base is effectuated by means of a disk control unit 14 which can be activated either by a student disk or an instructor disk, which disks hereinafter will be more fully described. The audio input from microphone 10 is translated by means of voice processing system 16 into digital relational signals, as described hereinbelow, and is then forwarded to a data processing system 18. Input/output terminal 12 is used not only to input information to the data processing system 18 but also to display questions and comments to the user from the data processing system 18.

Figure 2:
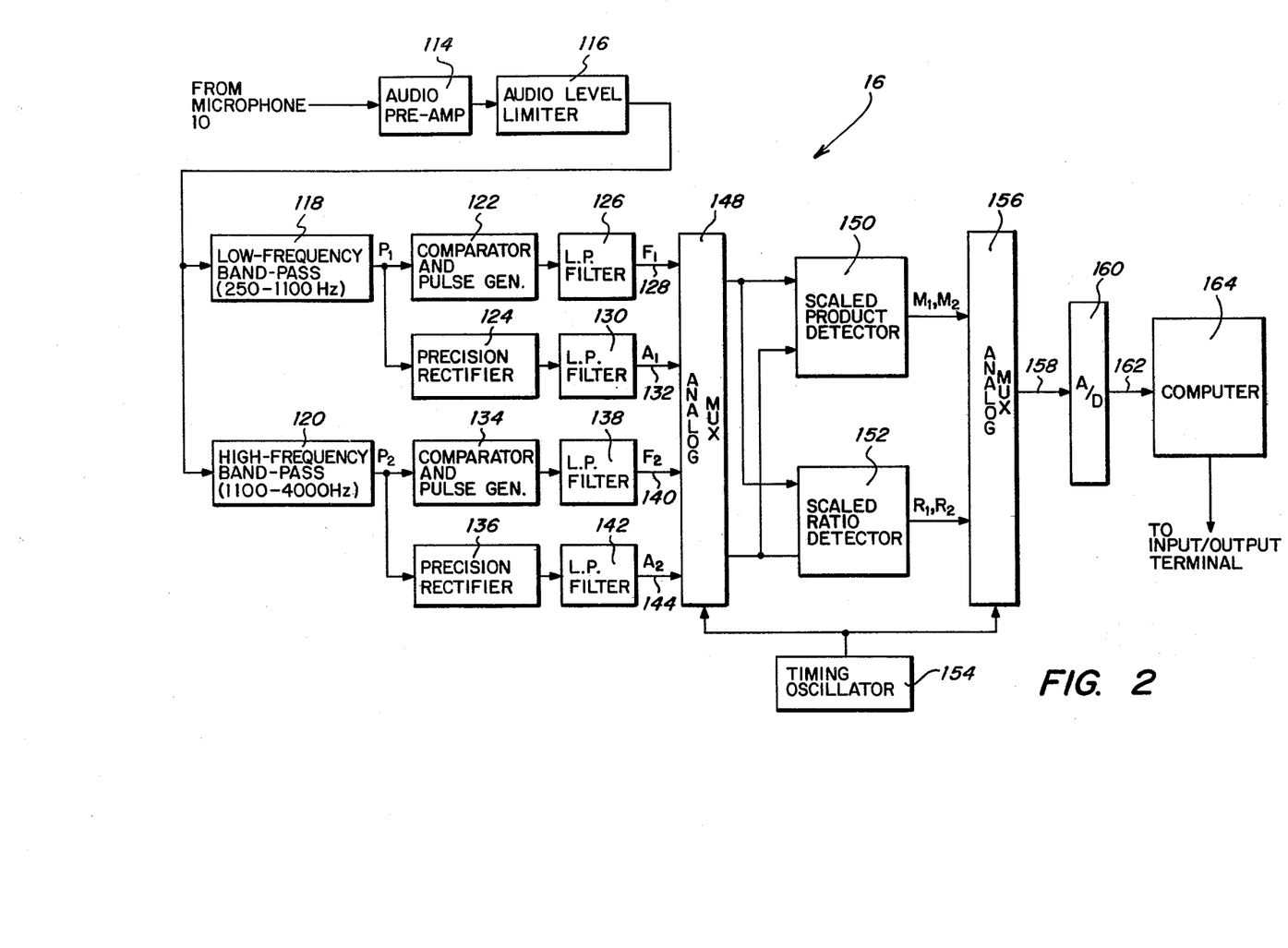
FIG. 2 is a block diagram of a voice processing system in accordance with the present invention.

Referring next to FIG. 2, a detailed block diagram of the preferred embodiment of the voice processing system 16 is shown. By way of overview, the audio processing system produces a group of digital words which are representative of an audio sound which has been input to microphone 10. The audio signal which comprises the word is passed through audio preamp 114 and audio level limiter 116 and is supplied to both the low frequency band pass filter 118 and the high frequency band pass filter 120. Only the respective low and high frequency signal components are passed through the respective filters. The low frequency signal component is transmitted to a comparator and pulse generator 122 as well as to a precision rectifier 124. The high frequency signal component is transmitted simultaneously to a comparator and pulse generator 134 and a precision rectifier 136.

In the comparator and pulse generator 122, the zero crossings of the low frequency signal are detected and a pulse is generated for each crossover. This pulse train is utilized to drive a monostable circuit to produce a constant width pulse train varied in frequency with the frequency of the low frequency component. This variable frequency pulse train is integrated by low pass filter 126 to produce a DC signal $F_1$, which is proportional to the frequency of the low frequency signal component produced by filter 118.

The low frequency signal component is also input to precision rectifier 124 and the rectified signal is transmitted to and integrated by low pass filter 130. The output of the low pass filter is a signal $A_1$ which is a DC signal proportional to the amplitude of the low frequency signal component generated by low frequency band pass filter 118.

A similar set of operations is carried out for the high frequency signal component of the input audio signal. The high frequency signal component $P_2$, is input to both the comparator and pulse generator 134 and the precision rectifier 136. In the comparator and pulse generator 134 a constant width pulse train is produced at the same frequency as the high frequency signal component. This is integrated by low pass filter 138 which produces signal $F_2$ which is a DC signal proportional to the frequency of the high frequency component. Signal $P_2$ is also provided to rectifier 136 for rectification, and the output is transmitted to low pass filter 142 where it is integrated to produce signal $A_2$. The signal $A_2$ is a DC signal which is proportional to the amplitude of the high frequency signal component, $P_2$, which is generated by the high frequency band pass filter 120.

The four signals $F_1$, $F_2$, $A_1$ and $A_2$ are selectively routed through an analog multiplexer 148 to both a scaled product detector 150 and a scaled ratio detector 152. The product detector 150 produces two signals. These are $M_1$, which is the product of frequency signals $F_1$ and $F_2$, and $M_2$, which is the product of the amplitude signals $A_1$ and $A_2$. The scaled ratio detector 152 produces output signals $R_1$ and $R_2$. $R_1$ is the ratio of the frequency signal $F_2$ to frequency signal $F_1$. $R_2$ is the ratio of signal $A_1$ to signal $A_2$. The two product and ratio signals are input to analog multiplexer 156 which selectively connects the signals to the analog digital converter 160. Each of the signals $M_1$, $M_2$, $R_1$ and $R_2$ are digitized and input to computer 164 via line 162. The sequence of digital words produced for each sound is recorded so that it may be correlated with a word or phrase previously input through input/output terminal 12, as described hereinafter.

Figure 3:
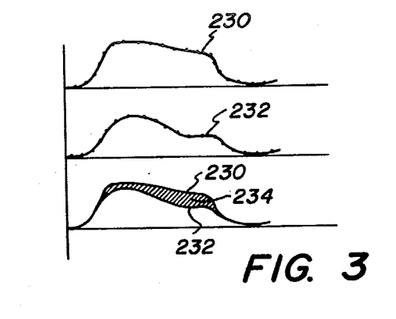
FIG. 3 is an illustration of the process for generating a master template.

The production of a master template to represent the spoken word or phrase is described with further reference to FIG. 3. The following process is carried out for each of the signals $M_1$, $M_2$, $R_1$ and $R_2$. Each of these signals is a relational quantity rather than an absolute magnitude or normalized quantity because it has been discovered that better voice recognition can be obtained by using these relational quantities. A relational signal is shown in FIG. 3 as line 230. This signal is digitized at each of the sample points shown thereon to produce a digital word representing each of the values of the signal at points shown. As one aspect of the preferred method of the present invention, the word or phrase for which the template is to be produced is spoken a number of times in order to produce a template which is sufficiently general to recognize a word despite variation in pitch or dialect. As the word is spoken the second and succeeding times, identical processing of the signal is carried out and a new line, line 232 shown in FIG. 3, is produced for each spoken word.

If the word was spoken in exactly the same manner as in the first instance, line 232 would correspond exactly with line 230. However, due to the differences between individual speakers and the differences in dialect, and even differences in pronunciation by the same person from time to time, these lines 230 and 232 will not necessarily be the same. The comparison of these two lines is shown in the overlay in FIG. 3. The lines 230 and 232 are separated by an area 234 which represents the variance between the two word samples. A plurality of samples are examined and the average value is calculated for each sample point together with the average variance for each sample point. These two units of information are recorded for each sample point. A template is produced in this manner for each of the four relational signals $M_1$, $M_2$, $R_1$ and $R_2$. The group of templates for each word or phrase constitutes a table which corresponds to the particular word or phrase.

Figure 4:
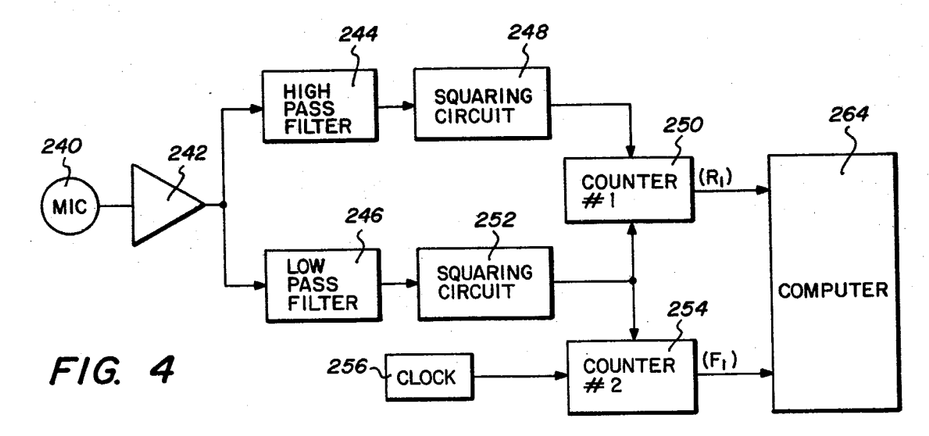
FIG. 4 is a block diagram of an alternative embodiment of the voice processing system in accordance with the present invention.

An alternative embodiment for the audio processing system 16 is illustrated in FIG. 4. The analog method described above in connection with FIG. 2 for generating the frequency proportional signals $F_1$ and $F_2$ does not in all cases have the greatest resolution which is needed to ensure accurate speech recognition. A circuit for producing these two signals with greater accuracy is that shown in FIG. 4. A microphone 240 receives a speech signal which is passed through an amplifier 242 and supplied to a high pass filter 244 and a low pass filter 246. To this point the signal processing is just the same as that described in the above embodiment.

The high frequency component of the audio signal is transmitted from the output of filter 244 to a squaring circuit 248. The output of the squaring circuit is input to a counter 250. The low frequency component of the input audio signal is transmitted from low pass filter 246 to a second squaring circuit 252. The output of the squaring circuit 252 is input to counter 250 and to a second counter 254. A clock 256 supplies a time reference signal to counter 254.

The output of squaring circuit 252 controls the gate of counter 250 so that the output is a count which is the ratio of the frequency of the high frequency component as compared to the frequency of the low frequency component. This digital signal corresponds to the analog signal $R_1$. The low frequency signal component output of squaring circuit 252 is input as the gate control for counter 254. This operates to count the pulses from the clock 256 with the number of clock pulses from the second counter being proportional to the frequency signal component output by low pass filter 246. The output of counter 254 is a digital word which corresponds to the analog signal $F_1$. The two signal outputs of counters 250 and 254 are inputs of the computer 164. The computer 164 then multiplies the contents of both counters for an estimate of the frequency of the high frequency component. The computer 164 then multiplies that product by the output of counter 254 for an estimate of signal $M_1$ which is the product of two frequency signals $F_1$ and $F_2$.

The advantage of the embodiment shown in FIG. 4 over the earlier-described analog embodiment is that there is no loss of time resolutions since there is no need to integrate pulses to derive a DC voltage. A second advantage is that when a cycle is not detected by the squaring circuit, the previous pulse carried over into the counter and fed into the computer. This technique eliminates the amount of erroneous data which would be transferred to the computer 164 as a result of poor signal resolution at the end of the speech period.

The details of the embodiments of the audio recognition systems shown in FIGS. 3 and 4 are described in more detail in copending U.S. patent application Ser. No. 114,724, filed on Jan. 23, 1980, for a Method and Apparatus for Speech Recognition, the disclosure of which is incorporated herein by reference. As described therein, the two above-described embodiments of an audio processing apparatus produce four relational signals, $M_1$, $M_2$, $R_1$ and $R_2$. There is still further relational signal which can be produced and included in the template previously described to assist in the recognition of speech.

The additional relational template is produced in the following manner. The high and low frequency signals, $F_1$ and $F_2$, are produced in the manner described for either of the above embodiments and are input to computer 164 and are stored as a series of numbers. The computer 164 treats the high and low frequency signal components separately but in the same fashion. The first data point represents the starting frequency in a given word or phrase. This data point is temporarily stored and the second data point is taken and divided by the first. The resulting quotient is stored as the first data point in the template. The third data point is then taken, divided by the first data point, and the quotient is stored as the second data point in the template. The procedure is continued for the duration of the speech sample. The process generates two additional sets of data for each speech sample and these additional data sets are added to the original tables to represent the dynamic changes in frequency for the two separate frequency bands. These two new sets of frequency data, although derived from the frequency lines, are independent of frequency. These two additional relational signals represent the dynamically changing patterns in time which are common to all voices. These additional signals make possible greater resolution of unknown speech samples while at the same time eliminating spectral variability across speakers because the additional templates are generated by relating the spectrum to itself across frequency and across time. Thus the frequency relationships are stored and analyzed rather than the absolute frequencies themselves.

Speech recognition has been described for the present invention using relational signals $M_1$, $M_2$, $R_1$, $R_2$ and the frequency relation across time. Further relational signals can be produced by using additional band pass filters and operating with each additional signal in the manner described above. In certain applications, all of the above described signals may not be required and the desired result may be achieved with use of only one or a few of those relational signals. In any event, the digital relational signals become part of the data base input to computer 164, as described hereinbelow.

Referring next to the data processing system 18, that system interacts with audio processing system 16 and input/output terminal 12, as shown in FIG. 1, with the aid of a digital computer. The data processing system 18 is comprised of the various software necessary to perform the functions, steps and operations hereinbelow described in conjunction with digital computer 164.

The invention incorporates three separate broad steps: an instructor step, a tutorial step; and a test step. The instructor step is first in the process of the subject invention. A data base is generated of questions and answers, keyboarded questions and answers as well as audio-generated answers, that can be utilized in the tutorial test steps of the subject invention.

Figures 5, 6, 7:
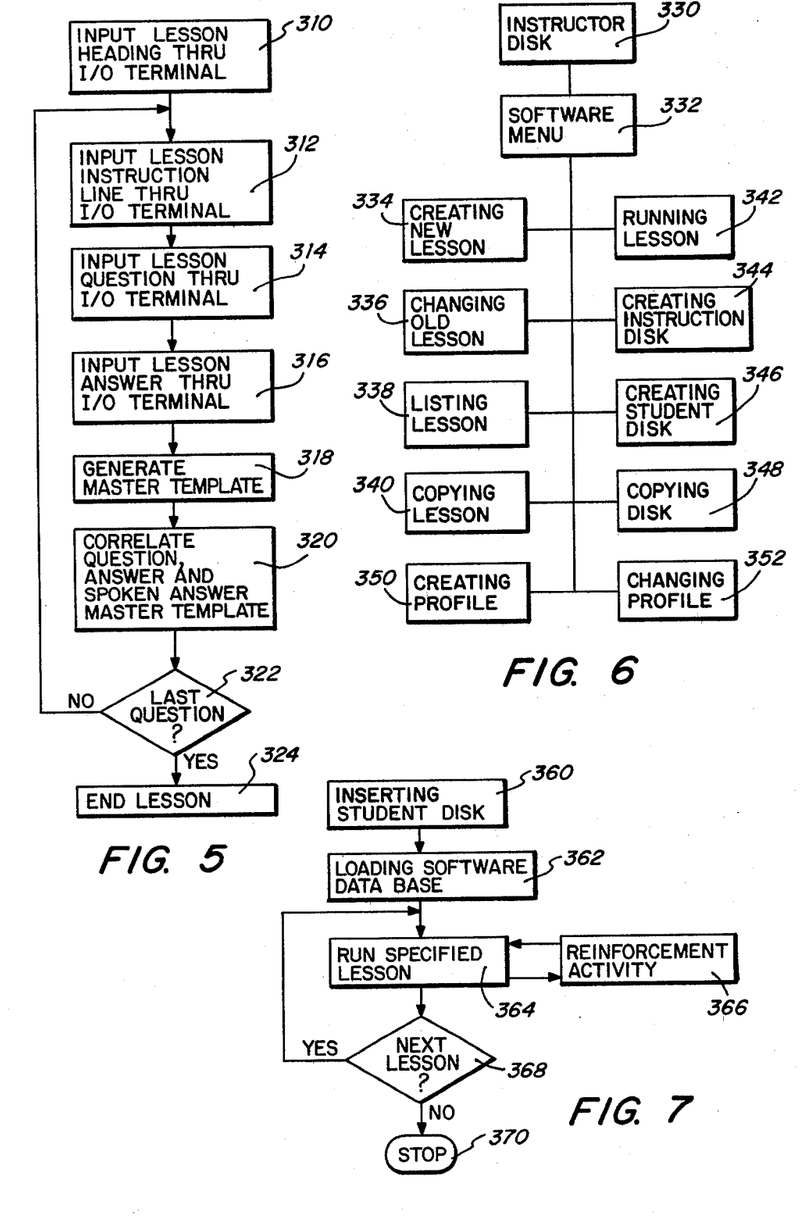
FIG. 5 is a block diagram of a process for generating a master lesson plan.
FIG. 6 is a block diagram of the software files available to an instructor.
FIG. 7 is a block diagram of the tutorial step of the subject invention utilizing the master lesson generated by the instructor.

As shown in FIG. 5, the first step 310 in the derivation of a data base is for the instructor to input a lesson heading via the input/output terminal 12 to computer 164. The next step 312 is for the instructor to input a lesson instruction line via the input/output terminal 12 to computer 164. The next step 314 is to input a question into the data base via computer 164 and input/output terminal 12, after which is step 316 where the correct answer is input to computer 164 through input/output terminal 12 for the data base. Then comes step 318, where the instructor speaks the correct answer into microphone 10 a number of times, preferably 3 or 4 times, to generate a master template for the word or phrase which constitutes the correct answer as described above in connection with FIGS. 2, 3 and 4. The keyboarded question, keyboarded answer and spoken answer master template are then correlated for storage in the data base in step 320 by the data processing system. The next step 322 is to determine whether the question and answer just correlated is the last in the lesson. If it is, the lesson is completed as indicated by step 324. If not, the instructor returns to step 312, inputting a lesson instruction line to the digital computer 164 to further enhance the data base through the input/output terminal 12, and steps 314-322 are then repeated.

EXAMPLE 1

A hypothetical example of the foregoing is as follows:

The lesson name: "English 101, Lesson 8."

The lesson instruction line: "Answer with the correct part of speech."

Typed question number 1: "What is a person, place or thing called?"

Typed answer number 1: "Noun."

The instructor then speaks the word "noun" 3 or 4 times.

Typed question number 2: "What do you call a word which modifies a verb?"

Types answer number 2: "Adverb."

The instructor speaks the word "adverb" 3 or 4 times. Then, the instructor enters another question or deems "English 101, lesson 8" to be complete.

Referring now to FIG. 6, the instructor has a number of alternative steps from which to choose within data processing system 18. By inserting an instructor disk into disk control unit 14 the instructor is presented with a software menu of options 332 from which to choose. Among the processes from which the instructor may so choose are: creating a new lesson, indicated by 334, which process was described above in connection with FIG. 5; changing an old lesson, shown by 336; listing a lesson in hard copy, shown by 338; copying a lesson from one disk to another, indicated by 340; running a lesson, shown by 342; creating a duplicate instructor disk, shown by 344; creating one or more student disks, as indicated by 346; and copying a disk, shown by 348. Two additional file options are changing a profile shown by 350, and creating a profile indicated by 352.

As previously indicated, a disk must be inserted into the control unit 14 of FIG. 1. There are two types of disks, instructor disks and student disks, and each disk contains all of the software necessary to utilize the subject invention. The broad process for creating a student disk with lessons on it is to choose step 334, creating a new lesson, from the menu 332, and then for the instructor to proceed in the manner described above in connection with FIG. 5. One or more lessons may be prepared as a data base is generated. From this, an instructor disk is prepared as in step 344, which instructor disk will have thereon the data base of one or more lessons generated by the instructor. A student disk is then created, as shown in step 346 of FIG. 6.

The two other broad steps of the invention require the use of the student disk. The student disk contains all the lessons for either a particular student or for a class, as desired. At the instructor's option, the disk can be configured to automatically run a specific lesson, or advanced students may be authorized to select a lesson from the range of lesson available on their disks. Each student disk, as well as each instructor disk, contains a segment called "profile record" which contains all of the general information needed by the system to conduct an instructional session. There are two subsegments to the profile record, one containing student session information and the other pertaining to technical information.

The student session information contained in the profile record segment includes a heading line, which is the first line displayed on the input/output terminal 12 when the system is activated after the disk is inserted into disk control unit 14 of FIG. 1. Next in the student session segment is the student name. This may be left blank if the student disk is intended for use by more than one student. Next in this segment is the instructor title. The student session subsegment also contains an automatic lesson indicator, which will contain the name of a lesson to be started automatically. If it is left blank by the instructor, there will be no automatic lesson and the student will be asked automatically by the data processing system 18 of FIG. 1 (via input/output terminal 12) which lesson the student wishes to study. A reinforcement activity indicator is provided, containing the name of the game or similar reinforcement activity to be run at intervals as a reward for the student. If it is left blank, no reinforcement activity time will be given. A tutorial mode reinforcement activity count is provided and contains the number of consecutive questions the student must answer during the tutorial step before earning the right to engage in reinforcement activity (if any reinforcement activity is to be used), and a review mode reinforcement activity count is provided, containing the number of consecutive questions the student must answer correctly on the first attempt during the test step before earning the right to engage in reinforcement activity. Another item in the student session section is the review mode question order. This allows the teacher to specify to the data processing system 18 whether the questions asked during the test step will be asked sequentially (in the same order as asked during the tutorial step) or whether they will be asked randomly. A review mode repetition count is provided and specifies the number of times the student will be asked each question during the review step. For example, a student may be tested on each question once, or the whole lesson may be asked twice. An "abandon question" count specifies the number of times in the test step a question will be asked, if the incorrect answer is given each time, before the question is abandoned and the next question is asked, and a "display report card" is also provided. This allows the instructor to specify whether or not at the end of the session, the student's record for the session will be displayed to the student.

The technical subsegment of the profile record includes a "T.V. clear" code which contains the home cursor and clear screen codes for the T.V. screen (CRT) being used. A timer option may be provided and specifies whether the digital computer being used as an optional timer card for session timing. An "instructor training count" allows the instructor to specify the number of times the instructor is to "speak" the correct answer in the instructor mode. A "student training count" is a counterpart data item to the instructor training count and specifies the number of times the student is to answer each question in the tutorial mode to provide adequate audio input which may be digitized and converted into relational signals that data processing system 18 can compare against the master template for adjustment to the individual student's pronunciation, if needed. There also is an automatic retrain count which specifies the number of incorrect answers which are allowed before the data processing system 18 dynamically updates the voice template during the test process to reflect the student's voice. A noise threshold key adjusts the noise threshold to reflect the nature of the environment in which the subject invention will be used, and an acceptance threshold identifies the maximum acceptable answer score for the answer to be considered for recognition. A delta threshold contains the minimum difference between the two lowest answer scores for the lowest score to be recognized.

The student's progress in the test process of a lesson is recorded on his student disk. This provides a continuous record of the student's experiences with each lesson run. To examine the "report card," the report card program on the student disk is activated to provide the instructor with a list of each lesson the student participated in and a few statistics pertaining to the student's performance.

Referring next to FIG. 7, there is shown a block diagram of an overview of the two remaining steps. First, as indicated by 360, a student disk is inserted into control unit 14. Then, the next step 362 is loading the software data base from the student disk into the digital computer. The specified lesson is run at step 364 and, as an optional next step 366, a reinforcement activity (such as a short video game) may be employed as a reward at the end of the lesson. Then, the next step 368 is to determine whether another lesson is to be run for the specific student. If not, the instructional session is terminated at step 370. Otherwise, the system returns to step 364, the next lesson is run, another reinforcement activity may be rewarded and so forth.

Figures 8, 9:
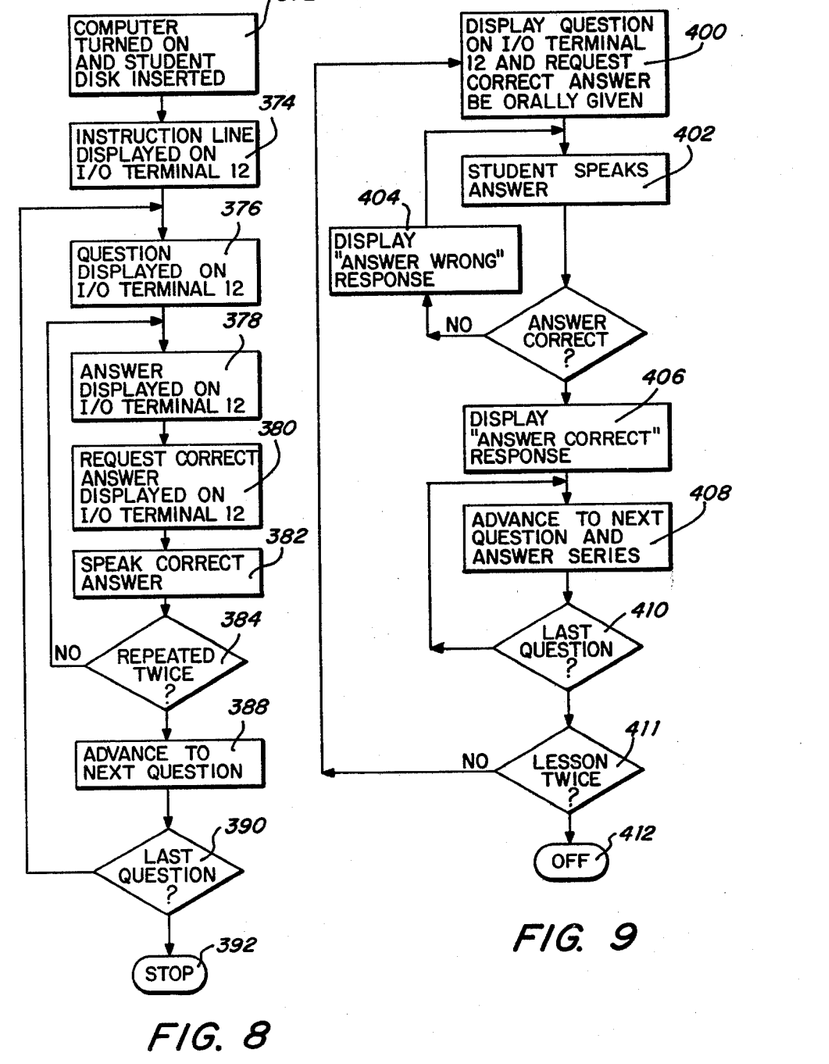
FIG. 8 is a block diagram of the steps of a specified student lesson process.
FIG. 9 is a block diagram of the student review step based on the master lesson generated by the instructor.

The second broad step of the subject invention, as described above, is the tutorial step. Assume that an instructor has prepared a lesson, generated an instructor disk (step 330 on FIG. 6) and then created a student disk (step 346 on FIG. 6). Referring now to FIG. 8, there is shown the details of this second broad step, which makes use of the so-generated student disk. As shown in the figure, at step 372 the digital computer 164 first is turned on and the student lesson disk is inserted into disk control unit 14 of FIG. 1. The digital computer 164 and the associated data processing system 18 may be programmed for an introduction, such as displaying the word "hello" and the student's name, identifying the subject to be studied and then telling the student how to proceed to start, after which the lesson will commence. The lesson will either be one which is preselected by the instructor or, for advanced students and at the option of the instructor, the student may select the lesson.

The next step 374 is for the computer to display the appropriate instruction on input/output terminal 12. Then a first question is displayed on the input/output terminal 12, as indicated by 376, and the correct answer is displayed on the input/output terminal 12, as indicated by 378. The display of the answer automatically follows the display of the question by a predetermined period of time. Then the next step 380 is to request the student (the request being displayed on input/output terminal 12) to speak the correct answer. The student does so at step 382. The correct answer to the first question display, request for articulation thereof, and oral response, (steps 378, 380 and 380) are repeated a second time, as indicated by 384. These two repetitive verbalizations of the same correct answer by the student provides relational data in digitized form as described above in connection with FIGS. 2, 3 and 4, by means of which the data processing system 18 adjusts the master template dynamically to reflect the particular pronunciation of the student on whose disk the data base has been recorded.

Then the computer 164 and the associated data processing system 18 advances to the next question, as indicated by 388, repeating steps 376, 378, 380, 382 and 384 in sequence. This process continues for each question and answer generated by the instructor for the lesson plan being utilized, as indicated at 390. When the last question has been completed, the lesson is completed, which is shown at step 392.

EXAMPLE 2

By way of example is the following hypothetical dialogue:

"Hello, Tommy. I am the Rote Machine. We are going to study English 101, Lesson 8. Press the space bar, when you are ready."

The student then depresses the space bar, and the lesson continues as follows:

"English 101 Lesson 8.
Answer with the correct part of speech.
What is a person, place or thing called?
'Noun' is the correct answer.
Say 'noun'. (Student says noun)."

The question is again displayed on input/output terminal 12, the answer is once more displayed thereon and the student is once more requested to say "noun". After the student's response the data processing system may then terminate the lesson, or go on to the test mode. If it is to go on to the test mode, it will then display a transitional instruction such as:

"Ok, Tommy. Now you know all that I know about it. This time I will ask the questions, but I won't tell you the answer. You tell me the answer."

The last of the three broad steps of the subject invention also involving the student, is the test step, which normally automatically follows the tutorial step to evaluate the student's comprehension.

As shown in FIG. 9, the first step 400 is automatic display of a question on the input/output terminal 12 and a request for the student's oral answer thereto. In response, in step 402 the student speaks what is believed to be the correct answer. The audio processing system 16 converts the spoken answer from an audio signal into relational signals, as described previously. The relational signals are then compared against the master template, as modified during the tutorial mode, to determine whether the student has articulated the correct answer. Because the system is only required to verify whether or not a correct answer has been articulated, rather than determining whether a spoken word is among a plurality of words recorded in a data base, system reliability should be quite high. If the student has not articulated the correct answer, the next step 404 is to display on input/output device 12 the fact that the student has not answered correctly, inform the student of the correct answer via input/output terminal 12 and return to step 402 whereupon the question is displayed in input/output terminal 12 a second time. If the student has given the correct answer, the next step 406 is to display the "correct answer" response on the input/output terminal 12, confirming that the given response was correct, and proceed to step 408, the next question. This sequence continues through the sequence of questions, as indicated by step 410, until the student has been tested upon the last question. The entire lesson may be repeated a second time, as shown by step 411, and then in step 412 the test is terminated.

EXAMPLE 3

An example of the type of dialogue which might occur is:

"What do you call a word which modifies a verb? Say the answer, please."

"Noun" [student answers incorrectly].

"Sorry, Tommy. 'Adverb' is the correct answer. Say 'adverb.'

'Adverb' [student answers correctly].

What is a person, place or thing called?

Say the answer, please.

'Noun' [student answers correctly].

Thats right, Tommy! 'Noun' is the correct answer."

The system may further utilize dynamic retraining or template modification, as noted above. As indicated above, at various stages a question is displayed by the computer on input/output terminal 12, the correct answer is displayed on input/output terminal 12, the student is requested to articulate the correct answer and when the student does so, the correct answer is then compared against the master template in either the tutorial mode or the test mode. If there is a match, the system goes on to the next question. If there is not a match but the answer is within a predetermined specified tolerance, then the master template is modified to reflect the specific pronunciation of the student by averaging in the template his response, using variance weighting. It is important to understand that because the system of the subject invention is only comparing a single word or phrase to determine whether a response is correct or incorrect (while prior art speech recognition systems need to determine whether to select a stored counterpart word or phrase from a plurality of possible words or phrases), it achieves a significantly higher recognition rate than heretofore achieved.

It is important to recognize also that the subject invention is designed to provide only positive reinforcement for the student, since it is intended to be used by persons of all ages. Many younger people in particular may be intimidated or may feel intimidated by the system, so that it is important to provide only positive reinforcement during the day to day operation, as well as perhaps with a reinforcement activity.

Although several embodiments of the invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention.

We claim:

1. A method of human-machine interactive instruction with the aid of a digital computer, comprising the steps of:
   (a) providing said computer with a data base of a series of questions and answers which can be reproduced and thereafter individualized for student use, by an instructor sequentially (i) providing the digital computer with a keyboarded typed question, (ii) providing the computer with a keyboarded typed correct answer, and (iii) speaking the correct answer a plurality of times to generate relational signals for a master template of the correct answer in digital form, and (iv) said computer correlating the master template with the corresponding keyboarded typed correct answer;
   (b) providing a human-machine interactive tutorial step by, for a plurality of questions and answers in said data base, sequentialy (i) displaying a typed question, (ii) displaying the corresponding correct typed answer, (iii) initiating the articulation of the correct answer by a student, (iv) processing the so-spoken answer by converting it from an audio signal into relational signals in digital form, (v) determining whether the processed spoken answer in digital form corresponds to the master template for that answer, and (vi) adjusting the master template to individualize it for the student if the processed spoken answer in digital form does not correspond to the master template; and
   (c) providing a human-machine interactive instruction test step by, for each question presented to the student in step (b), (i) displaying a typed question, (ii) initiating the articulation of an answer thereto, (iii) processing the so-spoken answer by converting it into relational signals in digital form, (iv) performing a voice verification step by comparing the processed spoken answer in digital form to the adjusted master template generated in step (b) (vi) to determine whether the processed spoken answer is the correct answer, (v) displaying an "answer correct" message along with the correct answer and proceeding to the next question in the plurality if the processed spoken answer in digital form is the correct answer, and (vi) displaying an "answer wrong" message along with the correct answer and repeating steps (c) (i)–(iv) a predetermined number of times if the processed spoken answer in digital form was not the correct answer.

2. The method of claim 1 wherein said instruction test step further includes the steps of (vii) dynamically retraining the adjusted master template generated in step (b) (vi) if after a predetermined number of repetitions the processed spoken answer in digital form does not match the adjusted master template but is within a specified predetermined tolerance to reflect the student's pronunciation, and then (viii) continuing on to the next question in the plurality of questions and answers.

3. The method of claim 1, wherein said spoken answer is converted into relational signals in digital form by (a) passing the audio signal which comprises the word through an audio preamp and an audio level limiter, (b) passing the audio signal to both a low frequency band pass filter and a high frequency band pass filter, (c) applying the low frequency component to a comparator and pulse generator and to a precision rectifier, (d) applying the high frequency signal component to a comparator and pulse generator and to a precision rectifier, (e) generating pulse trains of constant width that vary in frequency with the respective frequencies of the low frequency signal and the high frequency signal from said comparator and pulse generators, (f) integrating said pulse trains to produce two DC signals which are proportional, respectively, to the frequencies of the low and high frequency signal components, (g) integrating the outputs of the precision rectifiers to produce two DC signals which are proportional, respectively, to the amplitudes of the low and high frequency signal components, (h) multiplexing the four DC signals, (i) generating two relational DC signals from a scaled product detector which are, respectively, the product of the DC frequency signals and product of the DC amplitude signals, (j) generating two relational DC signals from a scaled radio detector which are, respectively, the ratio of the DC frequency signals and the ratio of the DC amplitude signals, (k) digitizing the four relational DC signals and inputting the sequence of digital words produced for each sound to said computer, and (1) correlating said sequence of digital words with the word or phrase that constitutes the keyboarded typed answer.

4. The method of claim 1 wherein said master template is generated by (a) processing a first correct spoken answer to produce a relational signal sequence of digital data points, (b) processing a second correct spoken answer to produce a second relational signal sequence of digital data points, (c) comparing said first and second sequences of digital data points to define an average value and average variance for each of the sequence of digital data points, (d) processing a further number of correct spoken answers to sequentially produce futher relational signal sequences of digital data points, comparing in turn each of such further sequences of digital data points to the previously defined average value and average variance to produce a new weighted average value and average variance for each of the sequence of digital data points.

5. The method of claim 4, comprising the further step of periodically updating the adjusted master template generated in step (b) (vi) by (a) displaying a typed question on an input/output terminal, (b) displaying the corresponding correct typed answer on an input/output terminal, (c) displaying a request on an input/output terminal for the articulation of the correct typed answer by the student, (d) processing the audio answer by converting it into relational signals in digital form, (e) determining whether the processed spoken answer in digital form corresponds to the master template to individualize it for the student if the processed spoken answer in digital form does not correspond to the master template.

6. The method of claim 1 wherein a data base is prepared for a specific lesson, said data base is recorded onto an instructor disk, and said lesson is copied onto a student disk.

7. The method of claim 1 where said data base is recorded onto an instructor disk.

8. The method of claim 1 comprising the further step of gnerating a record of each lesson a student has run and appropriate statistics on the student's performance, and recording said record on a student disk.

9. The method of claim 8 comprising at least one further step selected from the group consisting of creating a new lesson, changing an old lesson on an instructor disk, listing a lesson on an instructor disk, copying a lesson on an instructor disk, deleting a lesson on an instructor disk, running a lesson on an instructor disk, creating an additional instructor disk, creating a student disk from an instructor disk, transferring a lesson to or from a student disk, placing an individual student's name on the student disk, creating a profile record, and modifying a profile record.

10. A method of human-machine interactive instruction with the aid of a digital computer, said computer having been provided with a data base of a series of questions and answers which can be reproduced and thereafter individualized for student use, by an instructor sequentially (i) providing the digital computer with a keyboarded typed question, (ii) providing the computer with a keyboarded typed correct answer, and (iii) speaking the correct answer a plurality of times to generate relational signals for a master template of the correct answer in digital form, and (iv) said computer correlating the master template with the corresponding keyboarded typed correct answer, comprising the steps of:

(a) for a plurality of questions and answers in said data base, sequentially (i) displaying a typed question, (ii) displaying the corresponding correct typed answer, (iii) initiating the articulation of the correct answer by a student, (iv) processing the so-spoken answer by converting it from an audio signal into relational signals in digital form, (v) determining whether the processed spoken answer in digital form corresponds to the master template for that answer, and (vi) adjusting the master template to individualize it for the student if the processed spoken answer in digital form does not correspond to the master template; and (b) for each question presented to the student in step (a), (i) displaying a typed question, (ii) initiating the articulation of an answer thereto, (iii) processing the so-spoken answer by converting it into relational signals in digital form, (iv) performing a voice verification step by comparing the processed spoken answer in digital form to the adjusted master template generated in step (a) (vi) to determine whether the processed spoken answer is the correct answer, (v) displaying an "answer correct" message along with the correct answer and proceeding to the next question in the plurality if the processed spoken answer in digital form is the correct answer, and (vi) displaying an "answer wrong" message along with the correct answer and repeating steps (a) (i)–(iv) a predetermined number of times if the processed spoken answer in digital form was not the correct answer, (vii) dynamically retraining the adjusted master template if after the predetermined number of repetitions the processed spoken answer in digital form does not match the adjusted master template but is within a specified predetermined tolerance to reflect the student's pronunciation, and then (viii) continuing on to the next question in the plurality of questions and answers.

11. The method of claim 10, wherein said spoken answer is converted into relational signals in digital form by (a) passing the audio signal which comprises the word through an audio preamp and an audio level limiter, (b) passing the audio signal to both a low frequency band pass filter and a high frequency band pass filter, (c) applying the low frequency component to a comparator and pulse generator and to a precision rectifier, (d) applying the high frequency signal component to a comparator and pulse generator and to a precision rectifier, (e) generating pulse trains of constant width that vary in frequency with the respective frequencies of the low frequency signal and the high frequency signal from said comparator and pulse generators, (f) integrating said pulse trains to produce two DC signals which are proportional, respectively, to the frequencies of the low and high frequency signal components, (g) integrating the outputs of the precision rectifiers to produce two DC signals which are proportional, respectively, to the amplitudes of the low and high frequency signal components, (h) multiplexing the four DC signals, (i) generating two relational DC signals from a scaled product detector which are, respectively, the product of the DC frequency signals and product of the DC amplitude signals, (j) generating two relational DC signals from a scaled ratio detector which are, respectively, the ratio of the DC frequency signals and the ratio of the DC amplitude signals, (k) digitizing the four relational DC signals and inputting the sequence of digital words produced for each sound to said computer, and (l) correlating said sequence of digital words with the word or phrase that constitutes the keyboarded typed answer.

12. The method of claim 11, comprising the further step of periodically updating the adjusted master template generated in step (a) (vi) by a (a) displaying a typed question on an input/output terminal, (b) displaying the corresponding correct typed answer on an input-output terminal, (c) displaying a request on an input/output terminal for the articulation of the correct typed answer by the student, (d) processing the audio answer by converting it into relational signals in digital form, (e) determining whether the processed spoken answer in digital form corresponds to the master template for that answer, and (f) adjusting the master template to individualize it for the student if the processed spoken answer in digital form does not correspond to the master template.

13. The method of claim 10 comprising the further step of generating a record of each lesson a student has run and appropriate statistics on the student's performance, and recording said record on a student disk.

14. The method of claim 13 comprising at least one further step selected from the group consisting of creating a new lesson, changing an old lesson on an instructor disk, listing a lesson on an instructor disk, copying a lesson on an instructor disk, deleting a lesson on an instructor disk, running a lesson on an instructor disk, creating an additional instructor disk, creating a student disk from an instructor disk, transferring a lesson to or from a student disk, placing an individual student's name on the student disk, creating a profile record, and modifying a profile record.

* * * * *

UNITED STATES PATENT AND TRADEMARK OFFICE
CERTIFICATE OF CORRECTION

PATENT NO. : 4,468,204

DATED : August 28, 1984

INVENTOR(S) : Brian L. Scott and William D. Wagers, Jr.

It is certified that error appears in the above-identified patent and that said Letters Patent is hereby corrected as shown below:

```
Column 7, line 20, change "Types" to -- Typed --;
          line 61, change "lesson" to -- lessons --.
Column 12, line 3, change "sequentialy" to -- sequentially --;
           line 68, change "radio" to -- ratio --.
Column 13, line 18, change "futher" to -- further --;
           line 44, change "gnerating" to -- generating --.
Column 15, lines 12-13, change "input-output" to --
           input/output --.
```

Signed and Sealed this

Twenty-sixth Day of March 1985

[SEAL]

Attest:

DONALD J. QUIGG

Attesting Officer     Acting Commissioner of Patents and Trademarks